United States Patent
Zhang

[11] Patent Number: 5,245,165
[45] Date of Patent: Sep. 14, 1993

[54] SELF-CLOCKING GLYPH CODE FOR ENCODING DUAL BIT DIGITAL VALUES ROBUSTLY

[75] Inventor: Xiao B. Zhang, Foster City, Calif.

[73] Assignee: Xerox Corporation, Stamford, Conn.

[21] Appl. No.: 814,841

[22] Filed: Dec. 27, 1991

[51] Int. Cl.⁵ .................. G06K 7/10; G06K 19/06
[52] U.S. Cl. ........................ 235/454; 235/494
[58] Field of Search .................. 235/454, 487, 494

[56] References Cited

U.S. PATENT DOCUMENTS

| | | | |
|---|---|---|---|
| 3,898,434 | 8/1975 | Bigelow et al. | 235/494 |
| 3,959,631 | 5/1976 | Otten | 235/494 |
| 5,128,525 | 7/1992 | Stearns et al. | 235/454 |

FOREIGN PATENT DOCUMENTS

| | | | |
|---|---|---|---|
| 244290 | 10/1988 | Japan | 235/494 |
| 12390 | 1/1989 | Japan | 235/494 |
| 98087 | 4/1989 | Japan | 235/454 |
| 197896 | 8/1989 | Japan | 235/494 |

*Primary Examiner*—John Shepperd

[57] ABSTRACT

A self-clocking glyph code is provided for encoding dual bit digital values in the cardinal rotations (0°, 90°, 180° and 270°) of a logically ordered sequence of wedge-shaped glyphs that are written, printed, or otherwise recorded on a hardcopy recording medium in accordance with a predetermined spatial formatting rule. For example, these wedge-shaped glyphs suitably are essentially identical right triangles. The widths of such glyphs vary unidirectionally as a function of their height, so they can be decoded reliably, even when they are degraded by scan errors, dropped scan lines and/or random noise patterns. The decoding can be carried out in a variety of different ways, including by means of a bounding box analysis of the glyphs to determine whether the center of mass of each glyph is in the upper right, upper left, lower right or lower left quadrant of its bounding box; or by means of a bounding box analysis of the glyphs to determine whether the inclined surface of each wedge is on its right-hand side or its left-hand side and tilted to the right or left; or by means of a comparative run length analysis of each of the glyphs to determine whether its shortest run of adjacent ON pixels is spatially located above or below, and to the right or left of center of, its longest run of adjacent ON pixels.

9 Claims, 2 Drawing Sheets

Fig. 4a  Fig. 4c

SELF-CLOCKING GLYPH CODE FOR ENCODING DUAL BIT DIGITAL VALUES ROBUSTLY

FIELD OF THE INVENTION

This invention relates to self-clocking glyph codes for encoding machine readable digital information on hardcopy recording media and, more particularly, to self-clocking glyph codes for graphically encoding dual digital values compactly and robustly.

BACKGROUND OF THE INVENTION

Self-clocking glyph codes are suitable for transferring digital values of various types (e.g., machine control instructions, data values, memory pointers, and executable binaries) back and forth synchronously between the electronic and hardcopy domains. They, therefore, are a promising interface technology for integrating hardcopy documents and computer controlled electronic document processing systems more or less seamlessly.

A self-clocking glyph code typically is generated by mapping logically ordered digital input values of predetermined bit length, n, into a predefined set of $2^n$ graphically unique symbols (i.e., "glyphs"), each of is preassigned to the encoding of a different one of the permissible input values. Thus, each of the input values is transformed into and encoded by a corresponding glyph. These glyph encodings, in turn, are written on a hardcopy recording medium in accordance with a predetermined spatial formatting rule, thereby producing a glyph code that encodes the input values and preserves their logical ordering.

As will be appreciated, a code of the foregoing type carries the clock signal that is required for transferring the encoded digital values from the hardcopy domain to the electronic domain synchronously. Every input value is represented by a corresponding glyph, so the clock is embedded in the spatial distribution of the logically ordered glyphs. This is why these codes are referred to as "self-clocking" glyph codes. As will be appreciated, the self-clocking characteristic of these codes increases their tolerance to the degradation (i.e., image distortion and background noise) they may suffer when they are reproduced by photocopying and/or facsimile transmission. See a copending and commonly assigned Bloomberg et al. U.S. patent application that was filed Jul. 31, 1990 under Ser. No. 07/560,514 on "Self-Clocking Glyph Shape Codes" (D/89194), which hereby is incorporated by reference.

Prior self-clocking glyph codes are especially well suited for encoding signle bit digital values ("1" or "0"). Some of these codes also are useful for encoding short (e.g., two bit long) multi-bit values, but the cost and complexity of decoding these known codes tend to increase exponentially as a function of the bit lengths of the digital values that are encoded in their glyphs. This follows from the general rule that $2^n$ filtering steps are required for decoding a glyph code encoding of n-bit long digital values when $n > 1$. Moreover, these existing glyph codes tend to become less robust when they are used for encoding multi-bit values because their per glyph encoding capacity is increased by reducing the graphical distinctions between their glyphs. Accordingly, there is a need for self-clocking glyph codes for encoding dual bit digital values more robustly.

SUMMARY OF THE INVENTION

In response to the above-defined need, this invention provides a self-clocking glyph code for encoding dual bit digital values in the cardinal rotations (0°, 90°, 180° and 270°) of a logically ordered sequence of wedge-shaped glyphs that are written, printed, or otherwise recorded on a hardcopy recording medium in accordance with a predetermined spatial formatting rule. For example, these wedge-shaped glyphs suitably are essentially identical right triangles. The widths of such glyphs vary unidirectionally as a function of their height, so they can be decoded reliably, even when they are degraded by scan errors, dropped scan lines and/or random noise patterns. The decoding can be carried out in a variety of different ways, including by means of a bounding box analysis of the glyphs to determine whether the center of mass of each glyph is in the upper right, upper left, lower right or lower left quadrant of its bounding box; or by means of a bounding box analysis of the glyphs to determine whether the inclined surface of each wedge is on its right-hand side or its left-hand side and tilted to the right or left; or by means of a comparative run length analysis of each of the glyphs to determine whether its shortest run of adjacent ON pixels is spatially located above or below, and to the right or left of center of, its longest run of adjacent ON pixels.

BRIEF DESCRIPTION OF THE DRAWINGS

Additional features and advantages of this invention will become apparent when the following detailed description is read in conjunction with the attached drawings, in which:

FIGS. 4a–4c illustrate certain of the degradations that a glyph code can experience during facsimile transmission.

DETAILED DESCRIPTION OF THE ILLUSTRATED EMBODIMENT

While the invention is described in some detail hereinbelow with specific reference to an illustrated embodiment, it is to be understood that there is no intent to limit it to that embodiment. On the contrary, the aim is to cover all modifications, alternatives and equivalents falling within the spirit and scope of the invention as defined by the appended claims.

Figure 1:
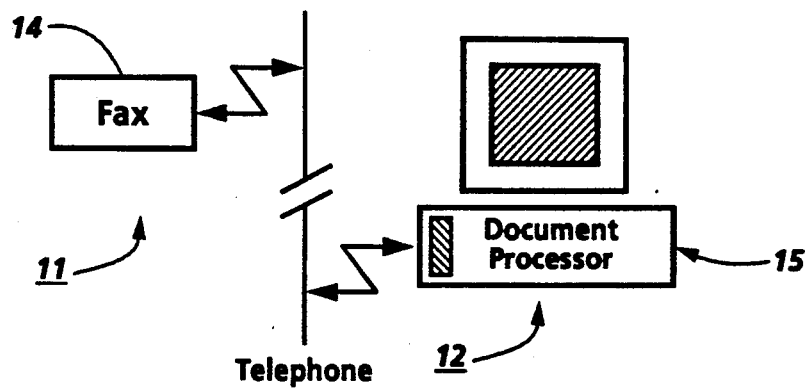
FIG. 1 is a simplified diagram of facsimile linked system for reading the glyph code of the present invention.
Figure 2:
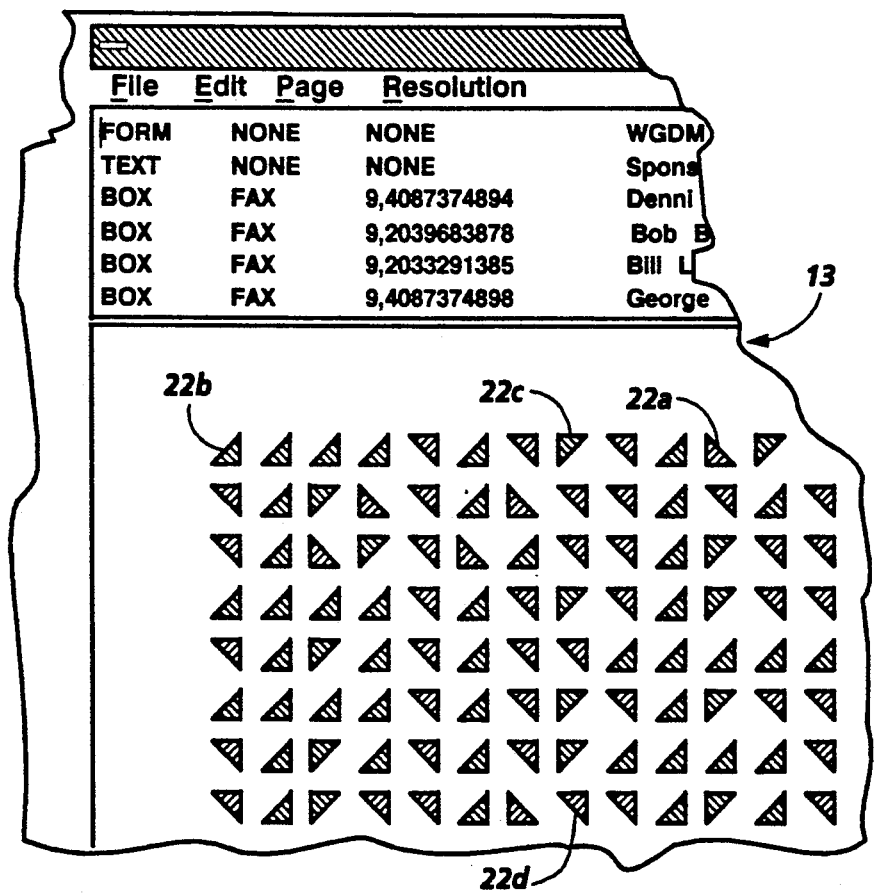
FIG. 2 is a fragmentary view of a printed form that carries a self-clocking glyph code that is constructed in accordance with this invention.

Turning now to the drawings, and at this point especially to FIG. 1, the operating environment for modern electronic document processing systems is becoming a hybrid environment in which human readable and machine readable information are transferred back and forth between an electronic domain 11 and a hardcopy domain 12. For example, a printed form 13 containing human readable and machine readable digital information (see FIG. 2) may read into an electronic document processing system 14 through the use of a remote facsimile terminal 15. The document processing system 14 may or may not capture the human readable content of the form 13, but it generally is intended to capture the machine readable digital content of the form 13 reliably.

Figure 3:
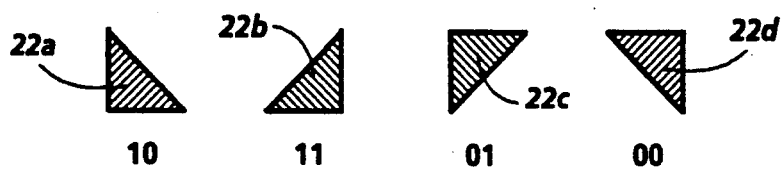
FIG. 3 is a diagram that correlates the glyphs of the code shown in FIG. 2 with the dual bit values they encode.

To that end, in accordance with this invention, the machine readable content of the form 13 is written in a self-clocking glyph code 21 that has wedge-shaped glyphs 22a–22d for encoding respective dual bit digital values. These dual bit values are encoded in the relative rotations of the glyphs 22a–22d; typically by preassigning each of the cardinal rotations (0°, 90°, 180° and 270°) of a desired wedge shape to the encoding of respective ones of the permissible dual bit digital values (see FIG. 3). For example, as isosceles right triangle that has its right angle essentially aligned with the vertical and horizontal axes of the form 13 may be employed as a canonical glyph shape, with the rotations that are used for encoding the different dual bit values being rotations of this canonical shape about one or both of its shorter sides. As will be appreciated, this produces a glyph set 22a–22d that is composed of essentially identical right triangles.

Figure 4C:
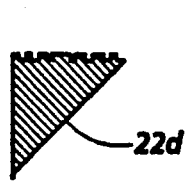
Figure 4C:
Figure 4C:
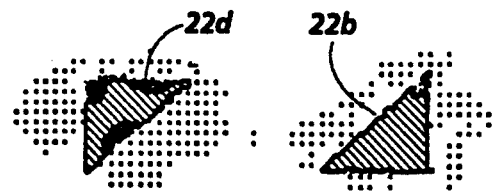
Figure 4C:
Figure 4C:
Figure 4C:
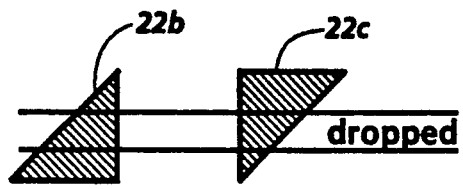

The glyph code 21 may be degraded significantly while being reproduced in hardcopy form (by means not shown) and/or while being read into the document processing system 14 by the facsimile terminal 15. For example, facsimile transmission of the glyph code 21 may introduce scan errors into the glyphs (FIG. 4a), truncate the glyphs or otherwise drop out some of the scan lines that define them (FIG. 4b), and/or superimpose a random noise pattern on the glyphs (FIG. 4c). However, the widths of the wedge-shaped or right triangular glyphs 22a–22d that are used to carry out this invention vary unidirectionally as a function of their heights, so various relatively straightforward image processing techniques can be employed for decoding them reliably, even if they are degraded.

Figure 5A:
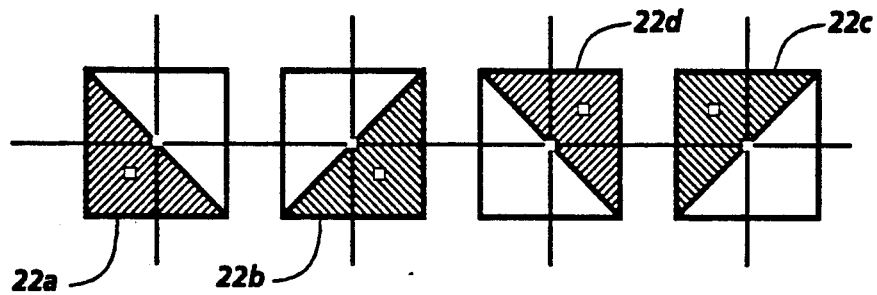
FIGS. 5a–5c diagrammatically illustrate different processes that can be used for decoding the code shown in FIG. 2, even if the code is degraded as indicated in FIGS. 4a–4c.
Figure 5B:
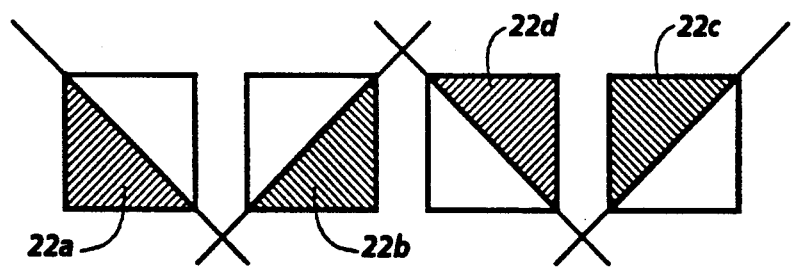

More particularly, to carry out the decoding, the document processing system 14 can generate a bounding box for each of the glyphs that is read into it and then determine whether the center of mass of each glyph is in the upper right-hand, upper left-hand, lower right-hand or lower left-hand guadrant of its bounding box (see FIG. 5a). Or, the document processing system 14 can generate a bounding box for each of the glyphs and then determine, for each glyph, (a) whether its longest side (i.e., its hypotenuse in the case of a right triangular glyph) is on the right-hand or left-hand side of the glyph and (b) whether it is tilted to the left or right (FIG. 5b). Still another alternative for the decoding of the glyph code 21 (see FIG. 5c) is to have the document processing system 14 examine a pixel map image of the glyphs it receives to determine, for each of them, whether the image of the glyph has its shortest run of ON pixels spatially located (a) above or below its longest run of ON pixels and (b) to the left or right of center of that longest run (as used herein, a "run" is a string of adjacent pixels that are aligned in the line scanning direction).

Figure 5C:
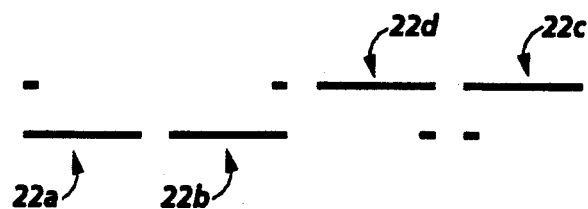

One of the advantages of using right triangular glyphs shapes is that each of them fills approximately one-half of a square bounding box, so there are substantially equal numbers of ON pixels and OFF pixels within such a bounding box. The glyphs 22a–22d, therefore, may be printed on the a recording medium in a tiled array of such bounding boxes to provide a self-clocking glyph code that has a substantially uniformly textured appearance. That same result can be achieved by encoding the dual bit digital input values in the cardinal rotations of a set of glyphs (not shown) that have essentially identical, equilateral triangular shapes. Moreover, a code composed of these equilateral triangular glyphs can be decoded, for example, by a modified form of the comparative run length decoding that is shown in FIG. 5c. Specifically, equilateral triangular glyphs can be decoded by determining whether they have a generally horizontal (laterally extending) or a generally vertical (longitudinal extending) side, and by then determining whether that side is spatially located either above or below (in the case of glyph having a generally horizontal side) the apex of the opposite angle, or (in the case of glyph having a generally vertical side) to the right or left of the apex of that angle.

As will be appreciated, the document processing system 14 may be configured to carry out a variety of different functions. As illustrated, it might be employed as a fax server, but that merely is one example of a function that the document processing system 14 might be designed to perform.

CONCLUSION

In view of the foregoing, it will now be understood that the present invention provide a self-clocking glyphs code that is especially well suited for transferring machine readable dual bit values back and forth between the hardcopy domain and the electronic domain. Furthermore, it will be evident that various decoding techniques can be used for reading this glyph code, even if the code is degraded significantly.

What is claimed:

1. A self-clocking glyph code for transferring dual bit digital values from a hardcopy recording to an electronic document processing system, said code comprising a logically ordered sequence of wedge-shaped glyphs written on said recording medium in accordance with a predetermined spatial formatting rule at relative angular orientations that encode respective ones of said values in said glyphs; said glyphs having permissible angular orientations oft approximately 0°, 90°, 180° and 270° with respect to a predetermined reference axis for encoding quantitatively different ones of said dual bit digital values.

2. The self-clocking glyph code of claim 1 wherein said reference axis extends laterally with respect to said recording medium.

3. The self-clocking glyph code of either of claims 1 or 2 wherein said glyphs have essentially identical right triangular shapes, each of which is bounded by two shorter sides and a longer side; the two shorter sides of each of said glyphs being substantially aligned laterally and longitudinally, respectively with respect to said recording medium.

4. The self-clocking glyph code of claim 3 wherein said glyphs have isosceles shapes.

5. A method for decoding a self-clocking glyph code having wedge-shaped glyphs that are oriented at angles of 0°, 90°, 180° and 270° for encoding quantitatively distinct dual bit digital values, said method comprising the steps of:

determining a bounding box for each of said glyphs; each bounding box having an upper right-hand quadrant, an upper left-hand quadrant, a lower right-hand quadrant, and a lower left-hand quadrant; and determining, for each of said glyphs, which of the quadrants of its bounding box contains its center of mass.

6. A method for decoding a self-clocking glyph code having wedge-shaped glyphs that are oriented at angles of 0°, 90°, 180° and 270° for encoding quantitatively distinct dual bit digital values, said method comprising the steps of:

finding the longest side of each glyph;

determining, for each glyph, whether its longest side is titled to the right or left and whether its longest side is to the right-hand or left-hand side of the glyph.

7. A method for decoding a self-clocking glyph code having wedge-shaped glyphs that are oriented at angles of 0°, 90°, 180° and 270° for encoding quantitatively distinct bit digital dual values, said method comprising the steps of:

finding a shortest run and longest run of ON pixels for each of said glyphs;

determining, for each glyph, whether its shortest run of ON pixels is spatially located above or below of its longest run of ON pixels and to the left or right of center of said longest run.

8. The method of any of claims 5-7 wherein said glyphs have essentially identical right triangular shapes that are oriented so that their shorter sides extend in generally horizontal and vertical directions, respectively.

9. The method of claim 8 wherein said triangular shapes are isosceles shapes.

* * * * *